2,940,944
RESINOUS COATING COMPOSITIONS

Roger M. Christenson, Richland Township, Allegheny County, Pa., assignor to Pittsburgh Plate Glass Company, a corporation of Pennsylvania No Drawing. Filed Jan. 19, 1956, Ser. No. 560,064

7 Claims. (Cl. 260—21)

This invention relates to resinous coating compositions having outstanding durability and chemical resistance, and pertains more specifically to coating compositions containing an aldehyde modified acrylamide interpolymer and an epoxidized oil.

In a copending application, Serial No. 490,409, filed February 24, 1955, it is disclosed that useful resinous materials are readily obtained by reacting an aldehyde, particularly formaldehyde, with an interpolymer of acrylamide and one or more polymerizable ethylenically unsaturated monomers. The resulting resins range from soft flexible materials to very hard solids, depending upon the choice of monomer utilized in preparing the acrylamide interpolymer which in turn is reacted with the aldehyde. The resins are useful in coating compositions, giving very tough and mar-resistant films which possess excellent chemical resistance.

It has now been discovered that outstanding coating compositions can be obtained by blending the aldehyde modified amide interpolymers with an epoxidized oil. The resulting coating compositions form films with excellent flexibility and durability. Moreover, these improved properties are obtained without loss of any of the desirable properties possessed by the aldehyde modified acrylamide interpolymers. These properties render the compositions of this invention particularly useful as finishes subjected to outdoor exposure, as well as for such other applications as container linings, and the like.

As stated hereinabove, acrylamide or other polymerizable amide is polymerized with one or more ethylenically unsaturated monomeric compounds, and the resulting interpolymer reacted with an aldehyde to form one component of the coating compositions of this invention. The exact mechanism whereby the acrylamide interpolymers are obtained is not definitely known, but is believed to begin by the formation initially of a relatively short chain soluble interpolymer having an approximate structure as follows, acrylamide being utilized for illustrative purposes:

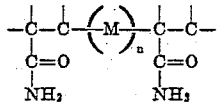

wherein M represents a unit of a monomer polymerizable with acrylamide, and $n$ represents a whole number greater than 1. For example, if styrene were utilized as the second monomer, M would represent the unit

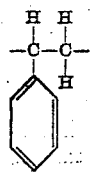

The short chain interpolymer then reacts with an aldehyde as represented by formaldehyde, to give the structure:

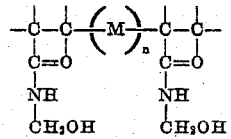

wherein M and $n$ have the significance set forth hereinabove.

In the event the formaldehyde is utilized in the form of a solution in butanol or other alkanol, etherification may take place so that at least some of the methylol groups in the above structure will be converted to groups of the structure

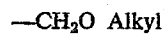

—$CH_2O$ Alkyl the alkyl group being derived from the alkanol utilized. The amount of etherification taking place depends in large measure upon the pH of the reaction medium, with acid conditions favoring etherification. The etherification of the acrylamide interpolymer is analogous to the conventional butylation of urea and melamine resins.

As will be seen hereinafter, similar products can also be obtained by polymerizing methylol acrylamide with one or more other ethylenically unsaturated monomers.

Among the monomers which may be polymerized with acrylamide are included methyl acrylate, ethyl acrylate, butyl acrylate, isobutyl acrylate, hexyl acrylate, octyl acrylate, styrene, vinyl toluene, maleate esters such as dibutyl maleate, acidic materials such as acrylic acid, methacrylic acid, maleic anhydride, vinyl ethers, vinyl ketones, vinyl pyridines, allyl acetoacetates, glycidyl acrylates, methacrylamide, dimethylbenzyl methacrylate, durenediol dimethacrylate, and the like. In general, it is preferred that the monomer utilized contain a single $CH_2=C<$ group in terminal position, and an especially preferred group of monomers includes ethyl acrylate, methyl acrylate, butyl acrylate, styrene, vinyl toluene, acrylic acid, and monomethyl styrene.

It has been found that preferred acrylamide interpolymers are obtained when at least two monomeric compounds are interpolymerized with the acrylamide. In this manner it is possible to tailor the interpolymer to have any desired degree of hardness or flexibility. For example, one useful ternary interpolymer is prepared from acrylamide, ethyl acrylate and styrene. Also, a small amount of methyl methacrylate tends to improve the hardness of two component interpolymers where one of the monomers is of the type which forms soft homopolymers, and a small quantity of an acid monomer such as acrylic acid, methacrylic acid, crotonic acid, maleic acid, or fumaric acid has been found to be particularly useful as an internal catalyst in that it imparts to the coating composition desirable fast curing properties. In place of acrylamide, any other polymerizable amide, for example, methacrylamide or itaconate diamide, may be utilized.

Interpolymers of acrylamide with one or more polymerizable monomers are most readily prepared by carrying out the polymerization in a solvent in which the acrylamide, a white, crystalline solid at room temperature, and the other monomer(s) are soluble, and at reflux temperatures. Butanol has proven to be a satisfactory solvent in most cases. Isopropyl alcohol, butyl Cellosolve, and mixtures of butanol or other lower alkanol with water can also be used advantageously as solvents. Some care must be exercised when water is present in the system as gummy precipitates may result, especially at the higher water levels. The presence of lower alcohols or water has been found to moderate the speed of reaction by lowering the reflux temperature. Butyl or ethyl acetate, or other ester solvents, and hydrocarbons such as xylene and the like may also be employed.

In carrying out the polymerization reaction a peroxygen type catalyst is ordinarily utilized. Useful catalysts for this purpose include acetyl benzoyl peroxide, hydroxyheptyl peroxide, methyl ethyl ketone peroxide, cyclohexanone peroxide, cyclohexyl hydroperoxide, 2,4-dichlorobenzoyl peroxide, cumene hydroperoxide, t-butyl hydroperoxide, methyl amyl ketone peroxide, acetyl peroxide, lauroyl peroxide, benzoyl peroxide, methyl cyclohexyl hydroperoxide, p-chlorobenzoyl peroxide, di-t-butyl peroxide, peracetic acid, t-butyl permaleic acid, di-t-butyl diperphthalate, t-butyl perphthalic acid, t-butyl peracetate, and the like. It has been found that two of the most economical of the above peroxygen compounds are entirely satisfactory in most instances; for example, cumene hydroperoxide can be used advantageously at higher reflux temperatures, whereas benzoyl peroxide has been very effective at lower reflux temperatures. For some polymerization reactions, mixtures of the above peroxygen compounds are used to secure desired conversions.

The diazo compounds, such as p-methoxyphenyl diazothio-(2-naphthyl) ether, may also be used as polymerization catalysts in the preparation of acrylamide interpolymers. Redox catalyst systems can also be employed.

The quantity of catalyst employed can be varied considerably; however, in most instances it is desirable to utilize from about 0.1 percent to 2.0 percent. If high viscosities are desired, a low initial level of catalyst, followed by the necessary additions to get 100 percent conversion, is preferably employed. For low viscosity interpolymers the bulk of the catalyst is added initially and later additions used only to secure desired conversions. Larger amounts of catalyst added initially give lower viscosities.

Since it is desirable that the interpolymers of acrylamide with other ethylenically unsaturated monomers be relatively low in molecular weight so that they can be dissolved at high solids and low viscosities, a chain modifying agent or chain terminator is ordinarily added to the polymerization mixture. The use of a lower alkanol such as butanol or a mixture of butanol and water as a solvent, together with high catalyst levels, aids considerably, but in most instances it is preferred to add controlled amounts of chain modifying materials. The mercaptans, such as dodecyl mercaptan, tertiary dodecyl mercaptan, octyl mercaptan, hexyl mercaptan, and the like are conventionally used for this purpose. However, other chain modifying agents or "short stopping" agents such as cyclopentadiene, allyl acetate, allyl carbamate, alpha-methyl styrene, alpha-methyl styrene dimers, and the like can be used to secure low molecular weight, as can unsaturated fatty acids or esters.

The polymerization is best carried out by admixing the acrylamide, or other polymerizable amide, and the other monomer or monomers, the catalyst and chain modifying agent, if any, in the solvent, and refluxing the resulting solution for a time sufficient to obtain the desired conversion. Ordinarily, the polymerization will be complete in about 1 to 16 hours. As indicated hereinabove, it may in some instances be desirable to add only a portion of the catalyst initially, the remainder being added in increments as the polymerization progresses. External cooling of the polymerization mixture or very accurate control of reflux conditions are important in carrying out the polymerization because of the very rapid reaction rate and because the reaction is highly exothermic. Some control of the heat of reaction is obtained by adding the acrylamide to the polymerization mixture incrementally. Good agitation is also desirable.

Another method for preparing acrylamide interpolymers involves utilization of "block" or "graft" techniques. Conventional polymerization procedures, such as that described in the foregoing paragraph, ordinarily result in a random distribution of the components in the interpolymers. By "block" or "graft" methods, the component can be introduced into the composition in regular sequence or order, each segment being of a certain length and periodicity. These products can be made such that the acrylamide portion is in fixed position in the chain, this approach involving the preparation of segments which react in groups or react in sites along a preformed backbone from which or to which other segments can be grown or attached. The properties of materials prepared by this relatively new technique are known to be quite different in many instances from interpolymers in which the components are randomly oriented. By the "block" or "graft" method, one can prepare, by choice, materials of different solubility, solvent and flame resistance, adhesion, water solubility, and, in fact, almost any desired property can be "tailored" into the interpolymer.

Useful resinous materials containing acrylamide are obtained by reacting the interpolymers prepared according to the method described above with an aldehyde. Formaldehyde, in solution in water (formalin) or in a lower alcohol such as butanol, or a formaldehyde yielding substance such as paraformaldehyde, trioxymethylene, or hexamethylenetetraamine, is greatly preferred. However, other aldehydes, preferably containing only atoms of carbon, hydrogen, and oxygen, and including acetaldehyde, butyraldehyde, furfural, and the like can be used.

It is preferred that the aldehyde be reacted with an interpolymer containing from about 5 percent to about 45 percent by weight of acrylamide, the balance being the other ethylenically unsaturated monomer(s). It has been found that those interpolymers containing the higher levels of acrylamide with those monomers which ordinarily form hard homopolymers, give hard and flexible films, whereas interpolymers containing lower levels of acrylamide with those monomers which ordinarily form soft homopolymers tend to be considerably softer. If more than one ethylenically unsaturated monomer is polymerized with acrylamide, the proportions of such additional monomers utilized will depend upon the characteristics which such monomer or monomers will impart to the final interpolymers. For example, in some ternary interpolymer systems it may be desirable to utilize about 20 percent by weight of acrylamide, and 40 percent each of two additional monomers such as styrene and butadiene, or in some instances, such as when acrylic acid or some other ethylenically unsaturated acid is utilized as an internal catalyst, it is desirable that the interpolymer contain about 20 percent acrylamide, a total of about 72 percent to 79 percent of two additional ethylenically unsaturated monomers and about 1.0 percent to about 8.0 percent of the unsaturated acid. The amount of the monomers necessary in any interpolymerization reaction can readily be determined by simple experiment.

It is ordinarily preferred to utilize two equivalents of formaldehyde for each amide group present in the interpolymer, although the amount may be in considerable excess of the amount necessary to form methylol groups on the polymer chain. Accordingly, this ratio may be raised or lowered considerably if desired. For example, the ratio may be as high as three equivalents of formaldehyde for each amide group in the interpolymer, or as low as about two-tenths equivalent of formaldehyde for each amide group in the interpolymer.

The reaction is preferably carried out in the presence of a mild acid catalyst such as maleic anhydride. Other acid actalysts such as oxalic acid, hydrochloric acid, or sulfuric acid, may also be utilized, although there is some possibility of gelation occurring if the catalyst is too strongly acidic. Alkaline catalysts such as sodium hydroxide, potassium hydroxide, hexamethylenetetraamine, and other basic amines may also be utilized, and, in fact, there is evidence to indicate that the use of the basic catalysts tends to give faster curing resin films.

If desired, the catalyst may be dispensed with entirely, although it is difficult to obtain satisfactory reaction unless a catalyst is employed. The quantity of catalyst utilized may be varied widely; for example, as pointed out hereinabove, the more acidic the reaction medium, the greater the amount of etherification which will occur if an alcohol solution of the aldehyde is utilized. If the aldehyde is not used in the form of an alcoholic solution, it is preferred to utilize from about 0.2 percent to 1.0 percent by weight of catalyst, based upon the weight of the acrylamide interpolymer which is reacted with the aldehyde.

The reaction of the acrylamide interpolymer with the aldehyde can be carried out simply by adding the aldehyde and the catalyst (if one is utilized) to the polymerization mixture obtained by polymerizing acrylamide and one or more ethylenically unsaturated monomers and refluxing the resulting mixture for a period of from about 3 to 5 hours until a desired viscosity is obtained. The water of condensation can be removed by azeotropic distillation as may a portion of the solvent if desired. In fact, when the aldehyde is utilized in the form of a solution in an alkanol such as butanol, it is desirable that approximately half of the butanol be distilled off at the end of the reaction period and replaced by another solvent such as xylol. It is desirable that the final resinous material have a solids content of about 20 percent to 70 percent and a Gardner-Holdt viscosity of about P to Z.

Similar polymeric materials may also be obtained by first reacting the acrylamide with an aldehyde such as formaldehyde to obtain an alkylol acrylamide, for example, methylol acrylamide, and then polymerizing the methylol acrylamide with one or more of the ethylenically unsaturated monomeric materials disclosed hereinabove. The polymerization utilizing methylol acrylamide is carried out in substantially the same manner as when acrylamide is interpolymerized with one or more monomers.

Regardless of the method by which the resinous material is obtained, the products which are blended with epoxidized oils in accordance with this invention will contain in the polymer chain recurrent groups having the structure

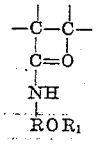

wherein R is a lower aliphatic hydrocarbon radical, that is, the radical derived by removing acrylamide from a lower aliphatic aldehyde; for example, if formaldehyde is utilized the radical R represents a methylene group (—CH$_2$—). When an alcoholic solution of the aldehyde, for example, a butanol solution of formaldehyde is employed, etherification may take place and at least a portion of the alcohol is reacted into the polymer chain so that at least some of the radicals R$_1$ will represent a lower alkyl radical such as butyl, or in other words, a mixture of hydrogen and butyl radicals. When the aldehyde is utilized alone, that is, not in an alcohol solution, the radical R$_1$ will, fo course, represent hydrogen. The free valences may be satisfied with either hydrogen or hydrocarbon, depending on the amide which is utilized.

The epoxidized oil plasticizing agents employed may be of a wide variety. They include the aliphatic and cycloaliphatic, aryl and aralkyl esters of an epoxy fatty acid, the fatty acid group normally containing about 8 to 22 carbon atoms. The fatty acid group may be derived from any animal, vegetable or marine oil containing unsaturated fatty acid groups; it may be derived from mixed fatty acids contained in such oils, or may be derived from isolated unsaturated fatty acids.

A wide variety of alcohol groups may be used for esterification of the epoxidized fatty acids. Such alcohols include those having a carbon group attached to the hydroxyl group, particularly monohydric aliphatic alcohols such as methyl, ethyl, propyl, or butyl alcohols; polyhydric alcohols such as the glycols, diethylene glycol and the like; glycerols and polyglycerols, and the like. The alcohols utilized for esterification also include aromatic alcohols, and aralkyl alcohols such as benzyl alcohol, and cycloaliphatic alcohols such as cyclohexanol. The epoxidized oil may contain quantities of esters free of epoxy groups; however, it is preferred to employ pure epoxy esters of mixtures in which most of the esters present have one or more epoxide groups in each molecule. Among the epoxidized oils, or epoxy fatty esters which may be admixed with the aldehyde modified acrylamide interpolymers in accordance with this invention are included the following:

Methyl epoxy stearate
Propyl epoxy stearate
Butyl epoxy stearate
Diethylene glycol diepoxy-stearate (epoxidized diethylene glycol dioleate)
Butyl epoxy ester of cottonseed fatty acid
Epoxy cottonseed oil
Butyl epoxy ester of soybean fatty acids
Epoxy soybean oil
Epoxy castor oil
Benzyl epoxy stearate
Cyclohexyl epoxy stearate
Phenyl epoxy stearate Other materials which may be utilized include epoxidized alkyd resins, epoxidized oils of higher polyols and fatty acids, for example, an epoxidized oil obtained by epoxidizing an ester of tall oil acids and pentaerythritol, and the like. All of the epoxy fatty acid esters disclosed hereinabove, as well as others, are readily prepared, for example, by the methods disclosed in U.S. Patent 2,458,484.

The quantity of fatty acid epoxide ester which is blended with an aldehyde modified acrylamide interpolymer to form the resinous portion of the coating compositions of this invention may be varied considerably. For example, amounts as low as about 5 percent by weight give enhanced properties to the coating compositions, and amounts as high as about 50 percent or more of the fatty acid epoxide ester may be employed. Preferably, the epoxide ester is utilized in an amount of about 10 percent to 30 percent by weight of the acrylamide containing interpolymer.

No special expedients are necessary in formulating the coating compositions of this invention. For example, they may be prepared simply by admixing a solution of the aldehyde modified acrylamide interpolymer with a solution of the fatty acid epoxide ester. No heating is required as the components may be blended readily in the cold state. Solvents utilized are likewise not critical and any solvent or solvent system which will dissolve the particular acrylamide interpolymer and epoxide ester may be employed. Since the acrylamide interpolymer is ordinarily prepared in a butanol solution, butanol is conveniently used as one of the solvents, although as pointed out hereinabove, it is desirable to replace about one half of the butanol with another solvent such as xylol.

Pigments such as titanium dioxide, carbon black, and the like may be added to the coating compositions to form any desired color. Other ingredients normally found in coating compositions, such as germicides, fillers, driers, silicones, and the like may also be added. It is also possible to include in the coating compositions of this invention other resinous materials, such as vinyl resins, alkyd resins, amine resins, or the like. Such resins are preferably utilized in minor amounts although larger quantities may also be employed.

When an internal catalyst such as acrylic acid, methacrylic acid, or the like is present in the interpolymer, no additional catalyst is needed to promote the cure of the films obtained from coating compositions disclosed herein. However, in the event the interpolymer does not contain an internal catalyst, it is desirable to add an acidic material shortly before the composition is to be utilized. Suitable catalysts for this purpose include citric acid, tartaric acid, and phosphoric acid, as well as latent catalysts, that is, materials which decompose into acidic materials when heated.

The following examples illustrate in detail the preparation of the resinous materials by the reaction of interpolymers of acrylamide with ethylenically unsaturated monomers, and an aldehyde, and the use of such materials in compositions with fatty acid epoxide esters. The examples are not intended to limit the invention, however, for there are, of course, numerous possible variations and modifications.

*Examples I to VI*

These examples illustrate the preparation of aldehyde modified acrylamide interpolymers which can be blended with fatty acid epoxide esters to form the coating compositions of this invention. The polymerization in each example was carried out by mixing the polymerizable components with a chain transfer agent (except in Example VI where none was utilized) in a solvent such as butanol or xylene, and adding a polymerization catalyst, either initially or in increments throughout the polymerization reaction. The polymerization mixture was then refluxed (in a bomb when butadiene-1,3 was the monomer) for a period of time sufficient to obtain a conversion of substantially 100 percent. The polymerization charge, reflux time, interpolymer properties, formaldehyde condensation procedure, and the properties of the resinous condensation product are reported in the following table wherein the letters have the following significance:

A—Benzoyl peroxide
B—Di-t-butyl peroxide
C—Cumene hydroperoxide
D—Alpha-methyl styrene dimers
E—Dodecyl mercaptan
F—Tertiary dodecyl mercaptan

|  | Example I  15% Acrylamide; (A) 25% Methyl Methacrylate; (B) 60% Ethyl Acrylate | Example II  20% Acrylamide; (A) 20% Methyl Methacrylate; (B) 60% Ethyl Acrylate | Example III  15% Acrylamide; (A) 25% Styrene; (B) 60% Ethyl Acrylate | Example IV  20% Acrylamide; (A) 40% Styrene; (B) 40% Butadiene | Example V  20% Acrylamide; (A) 40% Styrene; (B) 40% Butadiene | Example VI  20% Acrylamide; (A) 80% Vinyl Toluene |
|---|---|---|---|---|---|---|
| Polymerization Charge and Procedure: | | | | | | |
| Acrylamide ........... parts .. | 3 | 40 | 3 | 160 | 160 | 250 |
| Monomer A ........... do .... | 5 | 40 | 5 | 320 | 320 | 1,000 |
| Monomer B ........... do .... | 12 | 120 | 12 | 320 | 320 | -------- |
| Catalyst ............. do .... | 90.8 C | 2 A | 90.8 C / 90.8 A | 16.0 B | 16.0 B | 25.0 A |
| Modifier ............. do .... | 90.8 F | 2.0 D | 90.8 F | 8.0 E | 8.0 E | -------- |
| Solvent— | | | | | | |
| (Butanol) ........... do .... | 20.0 | 200 | 20.0 | 1,200 | 1,200 | 1,250 |
| (Xylene) ............ do .... | -------- | -------- | -------- | 500 | 500 | -------- |
| Reflux Time .......... hours .. | 4 | 1 | 6 | ¹16 | ¹16 | 10 |
| Polymer Properties: | | | | | | |
| Percent Solids ....... | 52.5 | 51.6 | 51.5 | 25.1 | 25.1 | 49.1 |
| Viscosity (Gardner) .. | Z3 | Z5–Z6 | Z | -------- | -------- | -------- |
| Formaldehyde Condensate: | | | | | | |
| Butanol Solution of Formaldehyde ........... Parts.. | 6.34 | 84.6 | 6.34 | 339 | 339 | 75/351 part resin |
| Maleic Anhydride .... do .... | 36.3 | 1.0 | 36.3 | 4.5 | 4.5 | 1.0 |
| Reflux Time .......... hours .. | 3 | 3½ | 3 | 4 | 4 | 16 |
| Final Product: | | | | | | |
| Percent Solids ....... | 50.1 | 48.95 | 50.6 | 49.4 | 49.4 | 41.3 |
| Viscosity (Gardner) .. | Y | Y | U–V | Z | Z | X–Y |
| Color (Gardner) ..... | 3–4 | <1 | 3–4 | 3–4 | 3–4 | 1–2 |

¹ Bomb.

Each of the interpolymers prepared according to the foregoing examples when blended with fatty acid epoxide esters form coating compositions which give clear, hard films having excellent flexibility and outstanding durability on outdoor exposure.

*Example VII*

Eighty-five parts of vinyl toluene, 15 parts of acrylamide, 1 part of cumene hydroperoxide and 1 part of tertiary dodecyl mercaptan were refluxed for 2 hours and 0.5 part of additional cumene hydroperoxide was added. Refluxing was continued for a further period of 2 hours. The product was then admixed with a solution comprising 2.0 moles of formaldehyde (40 percent solution in butanol) and ⅓ part of maleic anhydride added. The resulting mixture was then refluxed for 3 hours after which the butyl alcohol was distilled to provide a product having the following properties:

Percent solids ---------------------- 48–52.
Weight per gallon (pounds) -------- 7.9.
Viscosity (Gardner-Holdt) --------- X–Z.
Color (Gardner 1933) ------------- 8 (maximum).
Mineral spirits tolerance ---------- 400 (minimum).

The resin thus prepared was reduced to 45 percent solids in a mixture of butanol, mineral spirits and isophorone. Portions thereof were then drawn down on electrolytic tinplate with a 0.014 inch drawbar and the resulting films baked at 375° F. for 10 minutes. Can ends were made from the panels and processed in water at 250° F. for 60 minutes. No blushing or popping occurred.

*Example VIII*

Example VII is repeated except that 85 parts of styrene was substituted for the 85 parts of vinyl toluene.

An epoxidized oil bearing the trade name Admex 710 was then admixed in varying amounts with the formaldehyde modified acrylamide interpolymer to form clear coating compositions. Admex 710 is understood to be an epoxidized oil obtained by treating soybean oil with peracetic acid. The epoxidized oil has the following properties:

| | |
|---|---|
| Acid number | 1.0. |
| Color (Gardner) | 1–2. |
| Viscosity at 25° C. | 3.3 stokes. |
| Specific gravity at 25° C. | 0.9903. |
| Weight per gallon (pounds) | 8.24. |
| Refractive index | 1.47142. |
| Average molecular weight | 937. |
| Volume resistivity at 25° C.: | |
| Dry | $1.5 \times 10^{12}$ ohm cm. |
| After immersion | $0.5 \times 10^{12}$ ohm cm. |

The compositions were then spread onto steel plate and baked at varying temperatures. The quantity of formaldehyde modified acrylamide interpolymer utilized, the quantity of epoxidized oil utilized, the baking temperature and time, solution appearance, film appearance, Sward hardness, impact resistance and flexibility are reported in the following table:

| Percent acrylamide interpolymer | Percent epoxidized oil | 30 minute baking temperature, ° F. | Solution appearance | Film appearance | Sward hardness | Impact resistance (inches/pound) | Percent flexibility |
|---|---|---|---|---|---|---|---|
| 75 | 25 | 300 | Clear | Clear | 24 | -------- | >20 |
| 50 | 50 | 300 | ----do---- | ----do---- | ----- | 48 | >20 |
| 90 | 10 | 400 | ----do---- | Slightly yellow | 50 | 3 | >20 |
| 75 | 25 | 400 | ----do---- | ----do---- | 42 | 48 | >20 |
| 50 | 50 | 400 | ----do---- | Yellow | 24 | 48 | >20 |
| 90 | 10 | ¹ 300 | ----do---- | Clear | 44 | 2 | >20 |
| 75 | 25 | ¹ 300 | ----do---- | ----do---- | 42 | 48 | >20 |
| 50 | 50 | ¹ 300 | ----do---- | ----do---- | ----- | 48 | >20 |

¹ Catalyst—phosphoric acid utilized in an amount of 0.5 percent based on solids.

*Example IX*

A formaldehyde modified acrylamide-styrene interpolymer (15 percent acrylamide-85 percent styrene) was admixed with Admex 710 in a proportion of 85 percent of the interpolymer and 25 percent of the epoxidized oil and clear films thereof were sprayed onto Bonderite steel, one half of the panel being primed and the other unprimed. All were baked for 30 minutes at 300° F. and the films exposed to salt air in Florida for 9 months. On examination after the exposure period the films showed excellent durability with only slight loss in gloss and some very minor rust spotting. On the other hand, a film of the acrylamide interpolymer which was not blended with an epoxidized oil showed much loss of gloss and poor durability in general with severe erosion and poor color retention.

Obviously, a great many other aldehyde modified acrylamide interpolymers may be utilized in place of those specified in the examples. Similarly other epoxidized oils or epoxy fatty esters selected from those disclosed hereinabove may be substituted for the epoxy fatty esters of the examples. Modifications in the coating compositions may also be made; for example, pigments other than titanium dioxide may be utilized as may different solvent systems.

Thus, while specific examples of the invention have been set forth hereinabove, it is not intended that the invention be limited solely thereto, but to include all of the variations and modifications falling within the scope of the appended claims.

I claim:

1. A heat hardenable resinous composition comprising an ester of an epoxy fatty acid containing at least 8 carbon atoms, said ester containing only atoms of carbon, hydrogen and oxygen, and an interpolymer of an amide selected from the group consisting of acrylamide, methacrylamide and itaconic diamide and at least one other monomer containing a >C=CH₂ group, said interpolymer containing from about 5 to 45 percent by weight of said amide in polymerized form based on the total weight of said interpolymer and being characterized by having amido hydrogen atoms replaced by the structure

wherein R is a member of the class consisting of hydrogen, furyl and a saturated lower aliphatic hydrocarbon radical and $R_1$ is a member of the class consisting of hydrogen and lower alkyl radicals, said ester being present in an amount of from about 5 to about 50 percent by weight based on the weight of the resinous components of said composition.

2. The heat hardenable resinous composition of claim 1, wherein said ester is an ester of an epoxy fatty acid containing from about 8 to 22 carbon atoms and said ester contains only atoms of carbon, hydrogen and oxygen.

3. The heat hardenable resinous composition of claim 2, wherein R and $R_1$ are each hydrogen.

4. A heat hardenable resinous composition comprising an ester of an epoxy fatty acid containing at least 8 carbon atoms, said ester containing only atoms of carbon, hydrogen and oxygen, and a monoaldehyde-substituted interpolymer of acrylamide and at least one other monomer containing a >C=CH₂ group, said interpolymer containing from about 5 to 45 percent by weight of acrylamide in polymerized form based on the total weight of said interpolymer, said monoaldehyde containing only atoms of carbon, hydrogen and oxygen and from 1 to 5 carbon atoms, said ester being present in an amount of from about 5 to about 50 percent by weight based on the total weight of the resinous components of said composition.

5. The heat hardenable resinous composition of claim 4 wherein the monoaldehyde is formaldehyde and is present in an amount of from about 0.2 to 3 equivalents for each amide group of said acrylamide interpolymer, and said ester is an ester of an epoxy fatty acid containing from about 8 to 22 carbon atoms, said ester containing only atoms of carbon, hydrogen and oxygen.

6. A heat hardenable resinous composition comprising an ester of an epoxy fatty acid containing from 8 to 22 carbon atoms, said ester containing only atoms of carbon, hydrogen and oxygen, and an interpolymer of acrylamide and styrene, said interpolymer containing from about 5 to 45 percent by weight of acrylamide in polymerized form based on the total weight of said interpolymer, said interpolymer having been reacted with an amount of formaldehyde of from 0.2 to 3 equivalents of formaldehyde for each amide group of said interpolymer, said ester being present in an amount of from about 10 to 30 percent by weight based on the weight of the resinous components of said composition.

7. An article having a metallic surface having, as a coating thereon, a heat hardened film of the resinous composition of claim 1.

References Cited in the file of this patent

UNITED STATES PATENTS

| | | |
|---|---|---|
| 2,173,005 | Strain | Sept. 12, 1939 |
| 2,580,901 | Erickson et al. | Jan. 1, 1952 |
| 2,671,064 | Cowell et al. | Mar. 2, 1954 |
| 2,680,110 | Loughran et al. | June 1, 1954 |
| 2,692,271 | Greenspan et al. | Oct. 19, 1954 |